United States Patent Office 3,243,270
Patented Mar. 29, 1966

3,243,270
PREPARATION OF GELLED LIQUIDS
Pat W. K. Flanagan, Ponca City, Okla., assignor to Continental Oil Company, Ponca City, Okla., a corporation of Delaware
No Drawing. Original application June 1, 1960, Ser. No. 31,791. Divided and this application Dec. 11, 1964, Ser. No. 423,410
10 Claims. (Cl. 44—7)

This is a divisional application of Serial No. 31,791 filed June 1, 1960 and now abandoned. Application Serial No. 31,791 is a continuation-in-part of application Serial No. 831,072 filed August 3, 1959 and now abandoned.

This invention relates to improvements in the preparation of thickening agents for gelling certain organic compounds, especially the normally liquid hydrocarbons and mixtures thereof.

The gel compositions prepared in accordance to this invention may be used as charges for incendiary bombs, grenades, flame throwers, and the like. The gel compositions may also be used as hydraulic fracturing media for producing fractures in earth formations to increase the productivity of an oil well. Such procedures are described in the Oil and Gas Journal, volume 47, No. 24, beginning at page 76. Gelled hydrocarbon liquids are, of course, known in the prior art; but gelling agents of uniform and good quality have not been available so that such gels have often required difficult compounding conditions or could not be formed from liquid hydrocarbons by simple stirring or mixing with the gelling agent in the field. In addition, the gelling agents heretofore available have been liquids making it difficult to store the gelling agent under all conditions of temperature ranging from the tropics to the Arctic. In addition to having utility as gelling agents, the compounds prepared as gelling agents can be hydrolyzed to sulfinic acids.

It is therefore a principal object of the present invention to provide a gelling agent that obviates the disadvantages of the prior art compositions.

It is another object of my invention to provide a gelling agent that is a solid at temperatures ranging from 50 to 135° F., so that they may be used in any climate without changing the procedure used in forming the gelled composition.

Other objects and advantages of the invention will become apparent as the invention is hereinafter more thoroughly disclosed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

In brief, the foregoing objects and advantages are attained by a process which may be described as follows: A trialkylaluminum compound is added to sulfur dioxide in the presence of a solvent for the final reaction product at a temperature which may, generally speaking but with notable exceptions, vary from about —75 to about 50° C. The solvent, in addition to being a solvent for the reaction product, should have a boiling point above the reaction temperature employed. Following the reaction between the sulfur dioxide and the aluminum alkyl compound, the unreacted sulfur dioxide is removed.

Before proceeding with specific examples illustrating my invention, it may be well to indicate in general the nature of the materials required in the process.

Suitable trialkylaluminum compounds include trimethyl, triethyl, tributyl, tripropyl, tridodecylaluminum, and the like. The alkyl groups may be the same or different and may contain up to 20 or more carbon atoms.

Suitable solvents include ethers, especially the higher boiling ethers, heterocyclic nitrogen bases, and disubstituted amides, and hydrocarbons both aliphatic and aromatic. Compounds of the above type, other than the hydrocarbons, form co-ordination type complexes with the trialkylaluminum compound. Examples of these solvents which I have found particularly suitable are tetrahydrofuran, pyridine, and dimethyl formamide. I especially prefer to employ the latter, dimethyl formamide.

It is desired to point out at this time that, although hydrocarbons are suitable in preparing the gelling agent, a temperature below —10° C. must be employed. With the hydrocarbons, if a temperature above —10° C. is employed, the gel itself is formed rather than the separable gelling agent. Where it is desired to form a hydrocarbon gel directly, a hydrocarbon can be employed advantageously, as other solvents would require separation of the solvent first. It has been observed also that diethyl ether forms a gel at a temperature above about 10° C. Thus in using diethyl ether as the solvent, the temperature is kept below 10° C. unless the ether gel is desired. Tetrahydrofuran gels at a temperature above about 25° C.

Of course, the gelling agent is separated from the solvent if it is not the gel compound desired and also if the gel is to be formed at a different location or the like. Storage and shipping space is considerably lessened by separating the gelling agent which is not used in a short time. Also a big advantage obtained by separation of the solid or powdery gelling agent is that the danger of a gel occurring prematurely by inadvertently allowing the gelling agent-solvent composition to be subjected to gelling conditions.

In forming the gel, the hydrocarbons are preferred when economics is the determining factor which is usually the case.

The solvent, if it is to be separated, may be removed by any of the conventional means providing care, mainly in respect to temperature, is taken to avoid gellation during such operations. Thus the gelling agent, which is believed to be a sulfinate probably of the formula $Al(SO_2R)_3$ (where R represents alkyls) although applicant does not choose to be bound by such theory, may be separated from the reaction mass and solvent with different degrees of efficiencies by centrifuging, solvent extraction of the gelling agent or the reaction solvent therefrom, spray stripping, and distillation at atmospheric or distillation reduced pressure in some cases. With dimethyl formamide, distillation preferably at reduced pressure is permissible. I prefer it as the separation means.

Although, generally speaking, temperatures in the range of —75 to 50° C. are suitable for best results, I prefer to employ temperatures in a more limited range of —60 to 30° C. Normally, I employ a temperature in the range of about 0 to about 30° C. with great advantage with a solvent suitable for such ranges. As previously indicated, the preferred solvent in such a case is dimethyl formamide, although other disubstituted amides and the heterocyclic bases will not gel in this range.

It should be noted that the trialkylaluminum compound must be added to the sulfur dioxide rather than vice versa. Unsatisfactory results will be obtained when the sulfur dioxide is added to the trialkylaluminum compound unless very special precautions are taken such as employing very low temperatures or using one of the complexing solvents. Even when using one of the complexing solvents rather low temperature must be used.

The relative amounts of the different components can be varied greatly. As a rule, I try to avoid the use of an excess of the trialkylaluminum compound. This is true because this compound is not only expensive but an excess of this compound in the reaction mass causes undesirable side reaction. For that reason, I carry out the reaction in the presence of a slight excess of sulfur dioxide. As to the amount of solvent for the sulfur dioxide used that can also be varied greatly.

In order to disclose the nature of the present invention still more clearly, the following illustrative examples will be given. It is to be understood that the invention is not to be limited to the specific conditions or details set forth in these examples except insofar as such limitations are specified in the appended claims. In the examples, "parts by weight" bear the same relation to "parts by volume" as do grams to cubic centimeters.

*Example 1*

To a reaction vessel which had been purged with nitrogen was added 43 parts by weight of liquid sulfur dioxide dissolved in 50 parts by volume of hexane. 79 parts by weight of tri-n-octyl-aluminum dissolved in 100 parts by volume of n-hexane was added slowly (over a period of 2.5 hours) to the reaction vessel while the reaction mixture was maintained at a temperature of about −60° C. by means of a Dry Ice-acetone bath. After all the tri-n-octyl-aluminum had been added, the reaction mixture was allowed to warm slowly to room temperature. As the excess sulfur dioxide evaporated, the reaction mixture gelled and soon solidified to a clear glassy material. Total yield of solid material 212 parts by weight. The hydrocarbon can be removed from the gel by vacuum distillation at room temperature.

The residue remaining as a solid after the removal of the hydrocarbon can be used to gel a hydrocarbon or mixtures of hydrocarbons by merely adding the solid to such a product with heating and stirring.

*Example 2*

The process of Example 1 was repeated with the exception that iso-octane was used on an equivalent basis as the solvent instead of n-hexane. Similar results were obtained.

*Example 3*

A reaction vessel fitted with a gas inlet, a thermometer, a Dry Ice cooler condenser, and a magnetic stirring bar was purged with nitrogen and then charged with 90 parts by volume of tetrahydrofuran and 19 parts by volume of sulfur dioxide. 20 parts by volume of trioctyl-aluminum (85% pure) and 40 parts by volume of tetrahydrafuran were then added to the reaction vessel slowly during which time the reaction temperature was maintained at 25° C. while the contents were stirred. After all the trioctylaluminum and tetrahydrofuran had been added, the reaction mass was allowed to stand overnight. The thus cooled reaction mass is separated from the tetrahydrofuran solvent. The recovered gelling agent is then added to a hydrocarbon fraction whereby a gel is formed.

*Examples 4–6*

The procedure of Example 3 was followed except in Example 4 diethyl ether was used as the solvent instead of tetrahydrofuran; also a reaction temperature of 10° C. was used instead of 25° C. In Example 5, pyridine was used as the sulfur dioxide solvent; temperature of reaction varied from 25–30° C. In Example 6 dimethylformamide was employed as the sulfur dioxide solvent, and again the reaction temperature varied from 25–30° C.

In additional examples other trialkylaluminum compounds were substituted for the tri-n-octylaluminum used in Example 1. Specific trialkylaluminum compounds used were trimethyl, triethyl, tripropyl, and tridodecylaluminum. In each use, the results were similar to that obtained in Example 1.

I have found that the amount of the gelling agent prepared in accordance to my invention required to gel a hydrocarbon or mixtures thereof, corresponding to the approximate composition of gasoline, is about 4 weight percent based on the weight of the hydrocarbon. Of course, a greater amount of the gelling agent may be used, but such a modification is not necessary and is uneconomical. Hydrocarbons or mixtures of hydrocarbons boiling within the range of about 100 to 600° F. can be gelled by adding thereto about 4 weight percent of my gelling agent followed by mild heating and stirring. By mild heating is meant heating below the boiling point of the hydrocarbon mixture.

In the course of my experiments, I have found that the gel can be broken by treatment with excess sulfur dioxide. Heating the resulting liquid to expel the excess sulfur dioxide reconstitutes the gel.

While particular embodiments of the invention have been described, it will be understood, of course, that the invention is not limited thereto since many modifications may be made, and it is therefore contemplated to cover by the appended claims any such modifications as fall within the true spirit and scope of the invention.

The invention having thus been described, what is claimed and desired to be secured by Letters Patent is:

1. A method of preparing a gelled liquid selected from the group consisting of hydrocarbons, ethers, tetrahydrofuran, pyridine and dimethylformamide which comprises adding to the liquid to be gelled at least about 4 weight percent based on the weight of said liquid of a gelling agent prepared by the method which comprises: reacting a trialkylaluminum compound with sulfur dioxide, wherein said trialkylaluminum compound is added to said sulfur dioxide at a temperature varying from −75 to 50° C. in the presence of a solvent for the resulting reaction product, said solvent characterized further in that it has a boiling point above the reaction temperature employed and is selected from the group consisting of hydrocarbons, ethers, tetrahydrofuran, pyridine and dimethylformamide and then removing the unreacted sulfur dioxide and any undesired solvent, the gel being formed by heating the liquid having the so-formed gelling agent admixed therewith with stirring and sufficient heating to produce a gel.

2. A method of preparing a gelled hydrocarbon boiling within the range of 100 to 600° F. which comprises adding to the hydrocarbon to be gelled a gelling agent in an amount of at least about 4 weight percent based on the weight of said hydrocarbon, said gelling agent prepared by the method which comprises: reacting a trialkylaluminum compound with sulfur dioxide, wherein said trialkylaluminum compound is added to said sulfur dioxide at a temperature varying from −60 to 30° C. in the presence of a solvent selected from the group consisting of hydrocarbons, ethers, tetrahydrofuran, pyridine and dimethylformamide, and then removing the unreacted sulfur dioxide and any undesired solvent, the gel being formed by heating the hydrocarbon having the so-formed gelling agent admixed therewith with stirring and sufficient heating to produce a gel.

3. The method of claim 1 wherein the trialkylaluminum compound is trimethylaluminum.

4. The method of claim 1 wherein the trialylaluminum compound is triethylaluminum.

5. The method of claim 1 wherein the trialkylaluminum compound is tripropylaluminum.

6. The method of claim 1 wherein the trialkylaluminum compound is tri-n-octylaluminum.

7. The method of claim 1 wherein the trialkylaluminum compound is tridodecylaluminum.

8. The method of claim 1 wherein the solvent is an aliphatic hydrocarbon.

9. The method of claim 1 wherein the solvent is dimethylformamide.

10. A method of preparing a gelled hydrocarbon boiling within the range of 100 to 600° F. which comprises forming a gelling agent in the hydrocarbon to be gelled and providing the gelling agent so formed in an amount of about 4 weight percent based on the weight of said hydrocarbon which comprises: reacting a trialkylaluminum compound with sulfur dioxide, wherein said trialkylaluminum compound is added to said sulfur dioxide at a temperature varying from $-75$ to $50°$ C. in the presence of the hydrocarbon to be gelled as solvent, and then removing the unreacted sulfur dioxide and heating the mass to a temperature above about $-10°$ C. when such a temperature has not theretofore been attained.

References Cited by the Examiner

FOREIGN PATENTS 1,050,762  2/1959  Germany.
819,181  9/1959  Great Britain.

OTHER REFERENCES

Baker et al.: J.A.C.S., Nov. 5, 1953, vol. 75, pages 5193 and 5194.

DANIEL E. WYMAN, *Primary Examiner.*